United States Patent [19]
Ishikawa et al.

[11] Patent Number: 6,155,448
[45] Date of Patent: Dec. 5, 2000

[54] FUEL TANK

[75] Inventors: Takashi Ishikawa, Okazaki; Tomoyasu Arase, Toyota; Masahide Kobayashi, Nishikamo; Katsuyuki Miura, Toyota; Yoshihiko Hyodo, Gotenba, all of Japan

[73] Assignee: Toyota Jidosha Kabushiki Kaisha, Toyota, Japan

[21] Appl. No.: 09/273,007

[22] Filed: Mar. 19, 1999

[30] Foreign Application Priority Data

Mar. 23, 1998 [JP] Japan .................................. 10-074276
Oct. 12, 1998 [JP] Japan .................................. 10-289508

[51] Int. Cl.[7] .................................................. B65D 25/04
[52] U.S. Cl. ........................................... 220/562; 220/564
[58] Field of Search ..................................... 220/562, 563, 220/564, 723, 905, 4.14, 495.05, 495.06

[56] References Cited

U.S. PATENT DOCUMENTS

| | | |
|---|---|---|
| 2,378,467 | 6/1945 | De Kiss . |
| 2,508,906 | 5/1950 | Cunningham .......................... 220/4.14 |
| 2,736,356 | 2/1956 | Bender et al. ........................... 220/905 |
| 3,347,406 | 10/1967 | Katzenmeyer . |
| 3,617,034 | 11/1971 | Skinner . |
| 3,701,540 | 10/1972 | Pringle . |
| 3,756,367 | 9/1973 | Mitchell et al. .......................... 188/352 |
| 3,779,420 | 12/1973 | Knaus ..................................... 220/437 |
| 3,801,402 | 4/1974 | Suter ...................................... 156/182 |
| 3,931,907 | 1/1976 | Henie . |
| 3,949,720 | 4/1976 | Zipprich et al. . |
| 3,977,379 | 8/1976 | Weissenbach . |
| 4,256,150 | 3/1981 | Mockesch ................................... 141/5 |
| 4,579,139 | 4/1986 | Stouffer . |
| 4,880,135 | 11/1989 | Neou . |
| 4,951,699 | 8/1990 | Lipman . |
| 5,056,493 | 10/1991 | Holzer . |
| 5,421,383 | 6/1995 | Schmid . |
| 5,467,889 | 11/1995 | Ashton et al. ........................... 220/562 |
| 5,596,971 | 1/1997 | Kidokoro . |
| 5,722,374 | 3/1998 | Kidokoro et al. . |
| 5,746,185 | 5/1998 | Kidokoro et al. . |
| 5,746,186 | 5/1998 | Kidokoro . |

FOREIGN PATENT DOCUMENTS

| | | |
|---|---|---|
| 56-128221 | 10/1981 | Japan . |
| 60-157427 | 10/1985 | Japan . |
| 60-158922 | 10/1985 | Japan . |
| 60-158923 | 10/1985 | Japan . |
| 64-16426 | 1/1989 | Japan . |
| 7-132738 | 5/1995 | Japan . |
| 8-170568 | 7/1996 | Japan . |

*Primary Examiner*—Stephen Castellano
*Attorney, Agent, or Firm*—Kenyon & Kenyon

[57] ABSTRACT

A lower wall (8) forming a fuel storage chamber (5) becomes curved downward according to increase of the fuel amount, and at this time a support member (23) for supporting the fuel storage chamber (5) does not restrain the downward curvature of the lower wall (8), whereby the capacity of the fuel storage chamber (5) can be increased and whereby the amount of the fuel that can be stored in the fuel storage chamber (5) can be maintained at the maximum, as compared with structure inhibiting deformation of the lower wall (8).

9 Claims, 15 Drawing Sheets

FUEL TANK

BACKGROUND OF THE INVENTION

1. Field of the Invention

The present invention relates to a fuel tank for storing fuel.

2. Related Background Art

If there is a space above the fuel level in the fuel tank, the fuel will be evaporated and this evaporated fuel could be emitted to the atmosphere. For example, Japanese Laid-Open Patent Application No. H8-170568 discloses a fuel tank constructed in such structure that a fuel storage chamber for storing the fuel is made of an extensible envelope film and that the envelope film expands and contracts according to the amount of the fuel in the fuel storage chamber, thereby preventing the evaporated fuel from appearing above the fuel level in the fuel storage chamber. Specifically, the above envelope film is composed of an upper wall, a lower wall, and a side wall of a bellows shape connecting these upper wall and lower wall to each other, and the lower wall of the envelope film is attached to a flat bottom wall of a housing. The upper wall of the envelope film moves up and down in the housing, depending upon the fuel amount in the fuel storage chamber, and the side wall expands and contracts with the up and down motion of the upper wall. The capacity of the fuel storage chamber thus increases and decreases with the upper and down motion of the upper wall and the expansion and contraction of the side wall of the envelope film.

SUMMARY OF THE INVENTION

The inventor, however, found out the fact that, because in the above fuel tank the lower wall of the envelope film forming the fuel storage chamber was fixed to the bottom wall of the housing, the lower wall was not displaced or deformed according to the fuel amount in the fuel storage chamber and the maximum amount of the fuel that was able to be stored in the fuel storage chamber of the above fuel tank was thus smaller than the maximum that would have been expected if the lower wall should have been displaceable or deformable in the direction to increase the capacity of the fuel storage chamber, according to the fuel amount in the fuel storage chamber.

The present invention has been accomplished in order to solve the above issue and an object of the invention is to provide a fuel tank provided with a fuel storage chamber that is deformable according to the amount of fuel stored therein, wherein the amount of the fuel that can be stored in the fuel storage chamber is maintained at the maximum.

A fuel tank of the present invention is a fuel tank comprising a fuel storage chamber that is deformable according to the amount of fuel stored therein, wherein the fuel storage chamber comprises a lower wall to be curved downward according to increase in the amount of fuel and is supported by a support member that allows the lower wall to be curved downward.

Since this fuel tank of the present invention is constructed in such structure that the lower wall forming the fuel storage chamber becomes curved downward according to the increase in the amount of fuel and that at this time the support member for supporting the fuel storage chamber does not restrain the downward curvature of the lower wall, the capacity of the fuel storage chamber is increased as compared with the fuel tank not allowing such deformation of the lower wall.

Specifically, the fuel storage chamber is composed of an upper wall and a lower wall of a polygon opposed to each other, and peripheral walls connecting these upper wall and lower wall.

The walls constituting the fuel storage chamber are formed, specifically, in multilayered structure of resin.

The support member is preferably constructed in structure for supporting a peripheral part of the fuel storage chamber. When this structure is adopted, the support member for supporting the peripheral part of the fuel storage chamber does not restrain the downward curvature of the lower wall and, therefore, the lower wall is well curved downward.

The peripheral part of the fuel storage chamber is composed, specifically, of the peripheral walls, and connecting portions of the upper wall and lower wall connected to the peripheral walls.

The support member is preferably configured to support corners of the peripheral part. When this configuration is employed, the peripheral part, particularly at the corners, has higher rigidity than the other portions, because there are the upper wall, the lower wall, and vertical connecting portions for connecting adjacent peripheral walls. Hence the fuel storage chamber is supported well even by the structure for supporting only the corners. Since the support member is configured to support only the corners of the peripheral part as against the invention for supporting the whole of the peripheral part, the configuration of the support member is simplified. Even if the peripheral walls are deformed with deformation of the lower wall, the corners will rarely be deformed because of their high rigidity as described above. Therefore, the deformation of the peripheral walls and the lower wall is not restrained even in the structure for supporting the corners.

In a preferred configuration the peripheral walls have a flange member and the support member supports the flange member. When this configuration is employed, the support member supporting the flange member of the peripheral walls does not restrain the downward curvature of the lower wall and, therefore, the lower wall is well curved downward.

The support member is preferably configured to comprise vibration suppressing means for suppressing input of vibration from the outside of the fuel storage chamber thereinto. When this configuration is adopted, the vibration suppressing means suppresses vibration of the fuel storage chamber and also suppresses production of noise.

In a preferred configuration the vibration suppressing means is an elastic member and this elastic member supports the fuel storage chamber in a vibration-isolating manner. When this configuration is adopted, the vibration of the fuel storage chamber, for example, due to acceleration G or vertical G is transmitted to the elastic member and elastic action of this elastic member suppresses the vibration of the fuel storage chamber and also suppresses production of noise.

Here, the elastic member is, specifically, a vibration-isolating material of rubber.

Another specific example of the elastic member is a coil spring.

The support member is preferably an elastically deformable support member, which abuts against the lower wall, for supporting the lower wall, the elastically deformable support member being arranged to elastically deform while dispersing a load exerted by the lower wall according to the downward curvature of the lower wall. When this configuration is employed, the elastically deformable support member as the support member abuts against the lower wall and supports the lower wall with elastically deforming while dispersing the load exerted by the lower wall according to the downward curvature of the lower wall. Therefore, the support member allows the downward curvature of the lower wall while receiving the weight of the fuel storage chamber including the fuel. Thanks to this, the lower wall is well curved downward. Since the elastically deformable support member supports the fuel storage chamber while elastically deforming, it suppresses the vibration of the fuel storage chamber and also suppresses the production of noise.

Here, the elastically deformable support member is, specifically, a plurality of sheetlike resin members stretched so as to receive the lower wall.

Another specific example of the elastically deformable support member is a plurality of wirelike resin members stretched so as to receive the lower wall.

Another specific example of the elastically deformable support member is a foamed member on which the lower wall is mounted.

Another specific example of the elastically deformable support member is a spring member on which the lower wall is mounted.

Still another specific example of the elastically deformable support member is a rubber member on which the lower wall is mounted.

Here, for example, where the upper wall is arranged to be curved upward according to the increase in the fuel amount in order to further increase the amount of fuel to be stored in the fuel storage chamber, the fuel storage chamber is more curved downward than the upward curvature of the upper wall with increase of the fuel amount, because of the weight of the fuel storage chamber including the fuel. Therefore, deformation amounts of the upper wall and the lower wall are different from each other, which could result in twisting and in turn breaking the peripheral walls connecting them and making the capacity of the fuel storage chamber instable. Further, where a fuel meter (gage) for measuring the fuel amount of the fuel storage chamber is constructed to measure the fuel amount, for example, according to the deformation of the upper wall or the lower wall, the measurement will be inaccurate.

In contrast with it, the elastically deformable support member permits the downward curvature of the lower wall while receiving the weight of the fuel storage chamber including the fuel, as described above, so that the deformation amounts of the upper wall and the lower wall can be equalized. This prevents the breakage due to the twisting of the peripheral walls, stabilizes the capacity of the fuel storage chamber, and permits accurate measurement of the fuel amount.

When the support member is configured to have deformation amount adjusting means, which abuts against the lower wall, for adjusting a deformation amount of the downward curvature of the lower wall so as to match with a deformation amount of curvature of the upper wall, the deformation amounts of the upper wall and the lower wall become nearly equal to each other, which prevents the breakage due to the twisting of the peripheral walls, which stabilizes the capacity of the fuel storage chamber, and which permits the accurate measurement of the fuel amount.

In a preferred configuration there is provided curvature deformation regulating means for regulating the downward curvature of the lower wall at predetermined magnitude, below the fuel storage chamber. When this configuration is employed, the curvature deformation regulating means provided below the fuel storage chamber regulates the downward curvature of the lower wall at the predetermined magnitude, so that the lower wall is not deformed excessively over the predetermined magnitude. This protects the lower wall.

The curvature deformation regulating means is preferably an auxiliary fuel tank, located below the fuel storage chamber and connected to the fuel storage chamber, for temporarily storing the fuel from the fuel storage chamber. When this configuration is adopted, the auxiliary fuel tank is utilized as the curvature deformation regulating means and there is, therefore, no dead space below the fuel storage chamber. Therefore, this compactifies the fuel tank and, further, improves mountability of the whole fuel tank including the auxiliary fuel tank. In addition, the fuel in the fuel storage chamber is supplied to the auxiliary fuel tank with reliability, because the auxiliary fuel tank is located below the fuel storage chamber.

The auxiliary fuel tank is preferably configured in a shape to match with the shape of the lower wall during the downward curvature of the lower wall. When this configuration is employed, protection of the lower wall is further enhanced, because the shape of the auxiliary fuel tank matches with the shape of the lower wall during the downward curvature of the lower wall.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The preferred embodiments of the fuel tank according to the present invention will be described with reference to the accompanying drawings. In the figures, the same elements will be denoted by the same reference symbols and redundant description will be omitted.

The fuel tank of the present invention is used as a tank for storing the fuel to be supplied, for example, to an internal combustion engine. Of course, it can also be used as a tank for simply storing the fuel.

Figure 1:
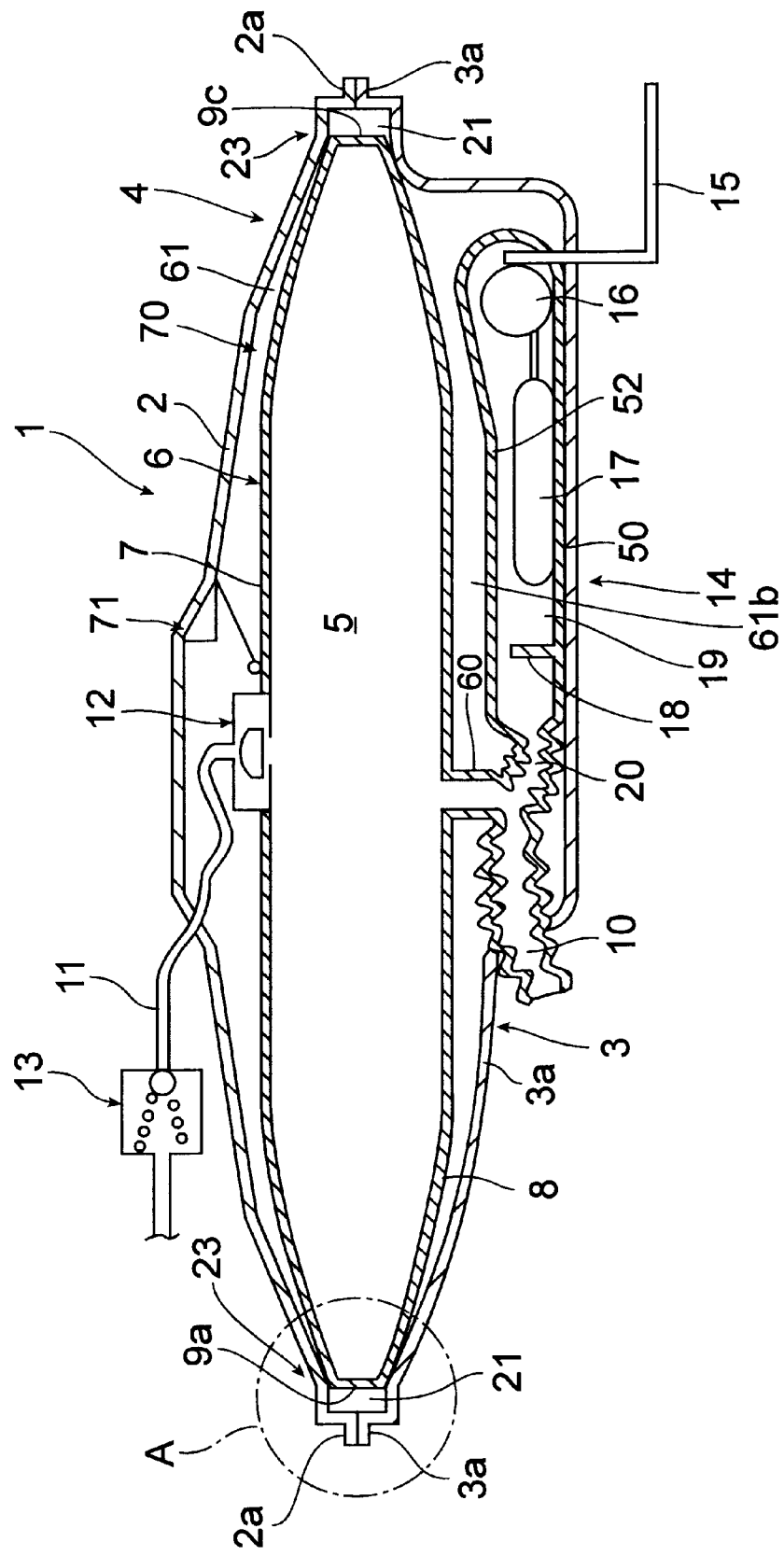
FIG. 1 is a partial sectional view to show a fuel storage apparatus provided with the fuel tank of the first embodiment.

FIG. 1 is a partial sectional view to show a fuel storage apparatus provided with the fuel tank of the first embodiment. This fuel storage apparatus 1 has a housing (also called a tank shell) 4 constituting the outer shell of the fuel storage apparatus 1. This housing 4 is made of a rigid member, such as metal or synthetic resin, and is composed of an upper portion 2 and a lower portion 3 separated up and down from each other. The upper portion 2 has an upwardly curved shape and the lower portion 3 has a downwardly curved shape. These upper and lower portions 2, 3 are hermetically connected to each other at flanges 2a, 3a formed around the entire periphery of each portion.

Inside an inner space defined by the upper portion 2 and lower portion 3 of the housing 4, there is a partition wall 6 (see FIG. 2) of a hexahedron, and this partition wall 6 partitions the inner space in the housing 4 into a fuel storage chamber 5 inside the partition wall 6 and upper and lower spaces 61a, 61b outside the partition wall 6. The partition wall 6 and fuel storage chamber 5 compose a fuel tank 70.

Figure 2:
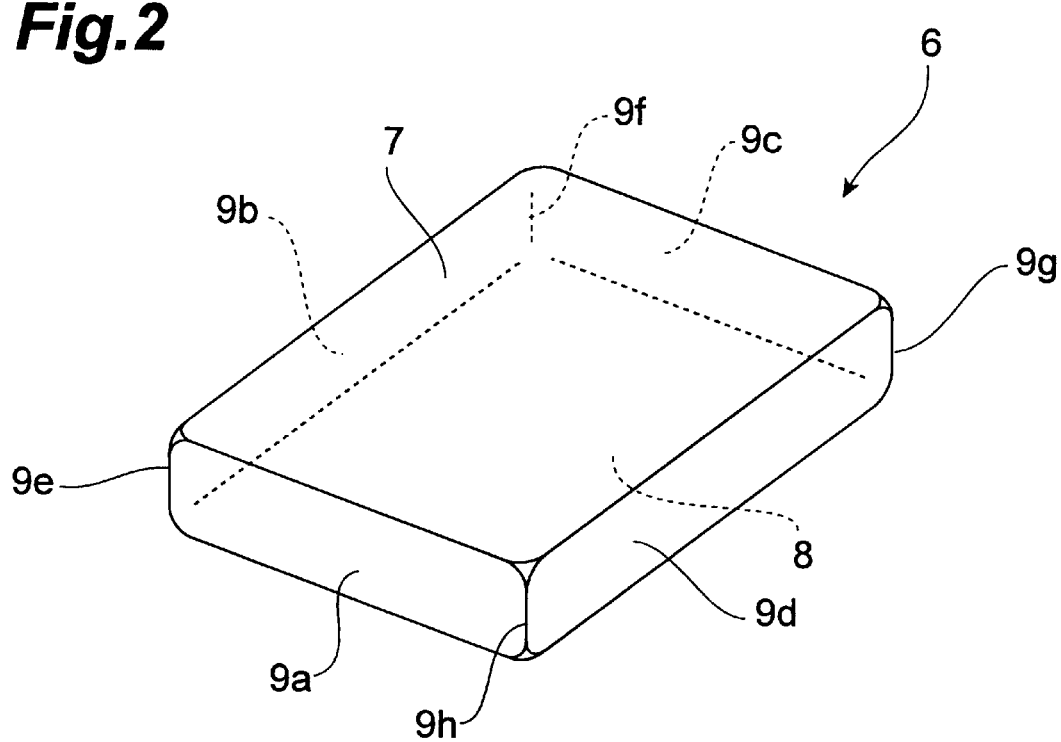
FIG. 2 is a perspective view to show the basic shape of the fuel tank.

The partition wall 6 forming the fuel tank 70 has the basic shape of substantially a rectangular parallelepiped, as illustrated in FIG. 2, and is comprised of a pair of substantially rectangular upper wall 7 and lower wall 8 opposed to each other in the vertical direction, and four substantially rectangular side walls (peripheral walls) 9a to 9d for connecting (or closing) corresponding edges of these upper wall 7 and lower wall 8 to each other. These side walls 9a to 9d are connected so that their both edges are connected to edges of other adjacent side walls and connecting portions 9e to 9h are formed between the side walls 9a to 9d.

The partition wall 6 having these upper wall 7, lower wall 8, and side walls 9a to 9d is formed, for example, in multilayered structure in which a skin layer of high-density polyethylene covers the both surfaces of the flat core part made of ethylene-vinyl copolymer resin or nylon. The partition wall 6 of this structure is substantially rigid and deformable.

The area of the upper wall 7 or the lower wall 8 is larger than the area of one side wall and the rigidity of the upper wall 7 and the lower wall 8 is smaller than that of the side walls 9a to 9d.

Here, the upper wall 7 and lower wall 8 are not limited to the rectangular walls, but may be a pair of polygonal walls. Accordingly, the upper wall 7 and lower wall 8 correspond to the polygonal walls, and the side walls 9a to 9d to the connecting walls connecting the upper wall 7 and the lower wall 8. The shapes of the upper wall 7, lower wall 8, and side walls 9a to 9d are properly selected, depending upon the shape of the space for the fuel tank 70 to be mounted.

Figure 3:
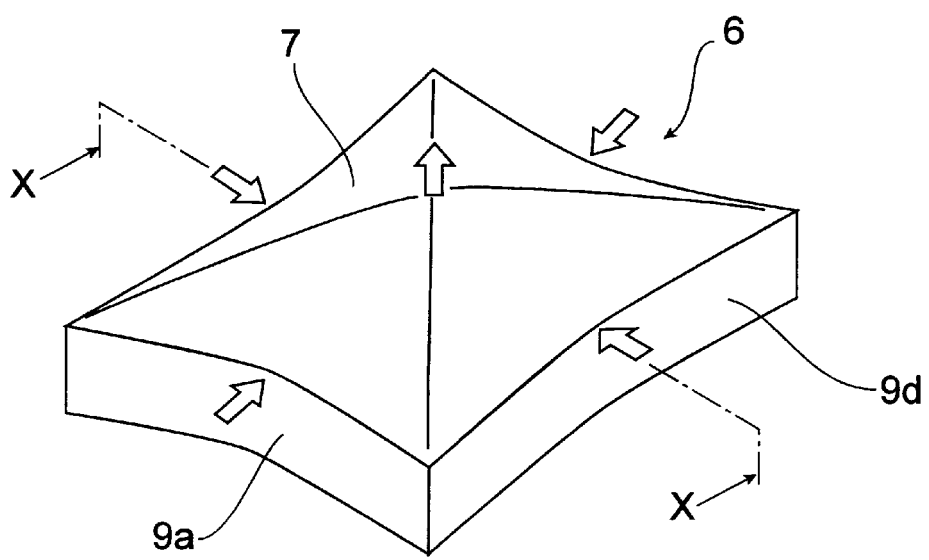
FIG. 3 is a perspective view to show a state of the fuel tank in which the fuel is full.
Figure 4:
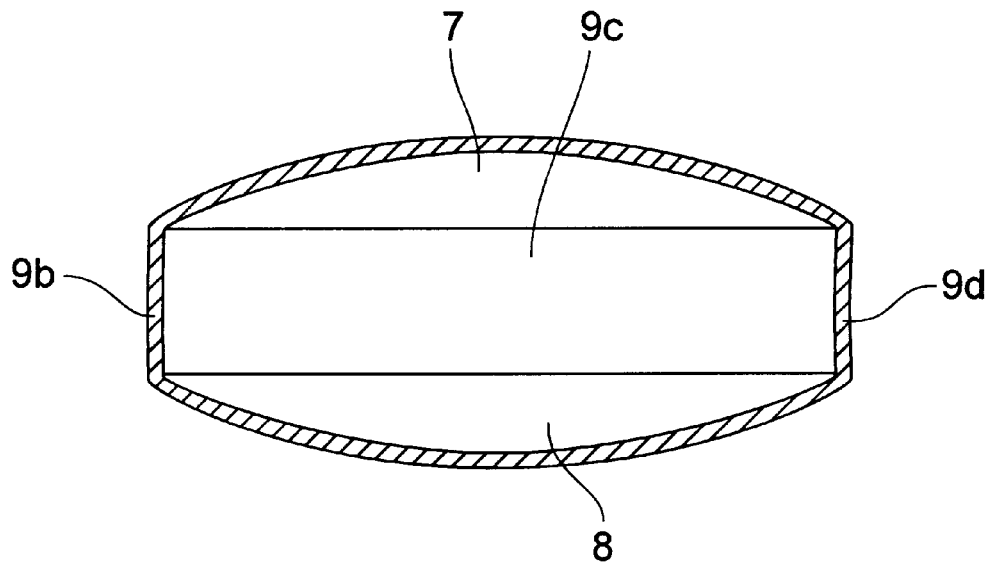
FIG. 4 is a sectional view taken along line X—X of FIG. 3.

As described above, the fuel storage chamber 5 of the substantially rectangular parallelepiped shape in the basic shape of the partition wall 6 is defined inside the partition wall 6. After with supply of the fuel into the fuel storage chamber 5 the fuel amount in the fuel storage chamber 5 exceeds one at which the rectangular parallelepiped shape can be maintained (hereinafter referred to as predetermined amount), the upper wall 7 and lower wall 8 move away from each other to be curved so as to inflate outward while the side walls 9a to 9d approach each other to be curved so as to be indented inward, as illustrated in FIG. 3 and FIG. 4.

More specifically, as the fuel amount in the fuel storage chamber 5 increases over the predetermined amount, the upper wall 7 suffers inflation due to the increase in the fuel amount to be curved so as to warp vertically upward, the lower wall 8 suffers inflation due to the increase in the fuel amount and the weight of the fuel to be curved so as to warp vertically downward, and the side walls 9a to 9d become curved so as to warp horizontally and inwardly. In this way the amount of the fuel that can be stored in the fuel storage chamber 5 increases gradually.

Figure 5:
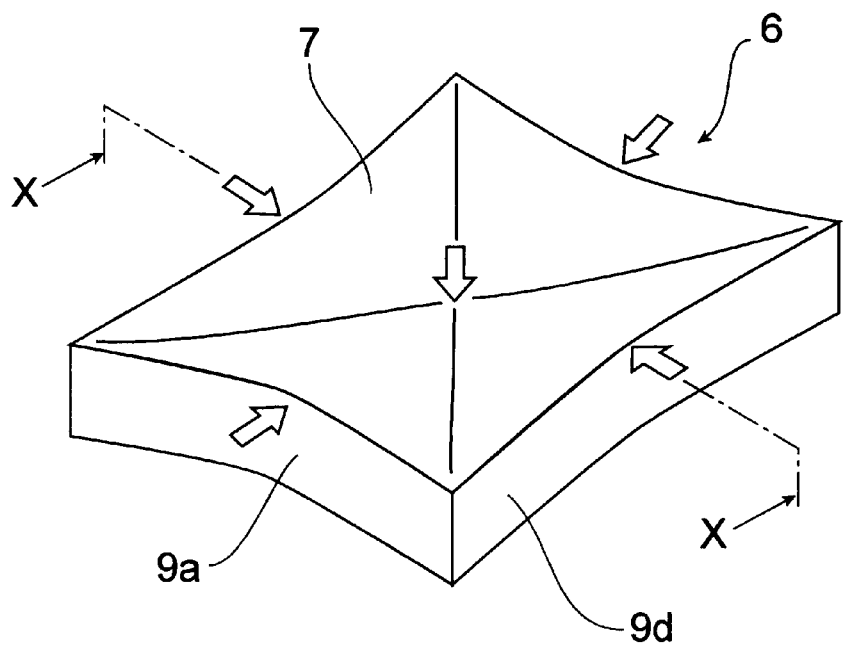
FIG. 5 is a perspective view to show a state of the fuel tank in which the fuel is little.
Figure 6:
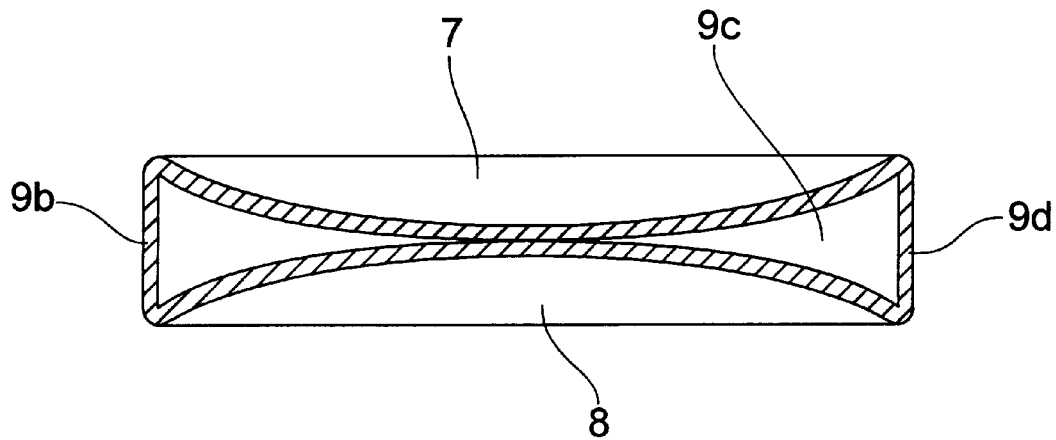
FIG. 6 is a sectional view taken along line X—X of FIG. 5.

On the other hand, as the fuel is discharged from the fuel storage chamber 5 so as to decrease the fuel amount in the fuel storage chamber 5 below the predetermined amount, the upper wall 7 and lower wall 8 move toward each other to be curved so as to be indented inward and the side walls 9a to 9d also move toward each other to be curved so as to be indented inward, as illustrated in FIG. 5 and FIG. 6.

More specifically, as the fuel amount in the fuel storage chamber 5 decreases below the predetermined amount, the upper wall 7 becomes curved so as to warp downward, the lower wall 8 becomes curved so as to warp upward, and the side walls 9a to 9d becomes curved so as to warp horizontally and inwardly. In this way the amount of the fuel that can be stored in the fuel storage chamber 5 decreases gradually.

Deformation amounts of the upper wall 7 and the lower wall 8 are greater than those of the side walls 9a to 9d. Accordingly, the upper wall 7 and lower wall 8 serve as large deformation surfaces, and the side walls 9a to 9d as small deformation surfaces.

Again referring to FIG. 1, a fuel pipe 60 for supplying or discharging the fuel into or from the fuel storage chamber 5 is connected to the approximate center of the lower wall 8 forming the partition wall 6. This fuel pipe 60 is branched below the lower wall 8 into a fuel supply pipe 10 and a fuel inlet pipe 20 connected to an auxiliary fuel tank 14 described hereinafter.

The fuel supplied through a fuel inlet (not illustrated) is supplied through the fuel supply pipe 10 and fuel pipe 60 into the fuel storage chamber 5 and is also supplied through the fuel inlet pipe 20 into the auxiliary fuel tank 14. During discharge of the fuel, the fuel in the fuel storage chamber 5 is sucked through the fuel pipe 60 and fuel inlet pipe 20 into the auxiliary fuel tank 14.

These fuel supply pipe 10 and fuel inlet pipe 20 permit the curvature deformation of the lower wall 8, because their pipe walls are formed in the bellows shape to be extensible and bendable at the connection to the fuel pipe 60. In the present embodiment the fuel inlet pipe 20 is formed in the bellows shape throughout the entire length thereof.

An evaporated fuel exhaust pipe 11 for discharging the gas, particularly the evaporated fuel, from the fuel storage chamber 5 to the outside of the fuel storage chamber 5 is connected through an isolation valve 12 to the approximate center of the upper wall 7 forming the partition wall 6. This evaporated fuel exhaust pipe 11 is flexible and permits the curvature deformation of the upper wall 7. The isolation valve 12 isolates the evaporated fuel exhaust pipe 11 to prevent the fuel from leaking to the outside of the fuel storage chamber 5 when the fuel level of the fuel storage chamber 5 reaches the isolation valve 12.

The evaporated fuel exhaust pipe 11 is connected through a check valve 13 and a charcoal canister (not illustrated) for temporarily adsorbing the evaporated fuel to a suction passage (not illustrated) of the internal combustion engine. The evaporated fuel adsorbed to this charcoal canister is discharged into the suction passage to be burned, according to the engine operating status of the internal combustion engine.

The above check valve 13 is opened when the pressure inside the evaporated fuel exhaust pipe 11 between the check valve 13 and the isolation valve 12 becomes over a positive pressure preliminarily determined. It is closed when the pressure is below the predetermined positive pressure. This action of the check valve 13 prevents the gas from flowing into the fuel storage chamber 5 after the isolation valve 12 has isolated the pipe 11.

Further, on the internal wall surface of the upper portion 2 of the housing 4 there is provided a fuel gage 71 for detecting a displacing position or a moving amount of the upper wall 7 in the vertical direction and for calculating the fuel amount in the fuel storage chamber 5. This fuel gage 71 is a pendulum type gage which computes the fuel amount from an angle of displacement of a pendulum.

The auxiliary fuel tank 14 for temporarily storing the fuel from the fuel storage chamber 5 is located on the lower portion 3 of the housing 4 and below the lower wall 8 on the side between the fuel pipe 60 and the side wall 9c. Placed inside this auxiliary fuel tank 14 is a fuel pump 16 for feeding the fuel from the auxiliary fuel tank 14 through a fuel feed pipe 15 to fuel injection valves (not illustrated) of the internal combustion engine. This fuel pump 16 sucks in the fuel through a filter 17 for filtering dust or the like in the fuel and feeds the fuel to the fuel injection valves with controlling the pressure of the fuel to a predetermined value.

Figure 7:
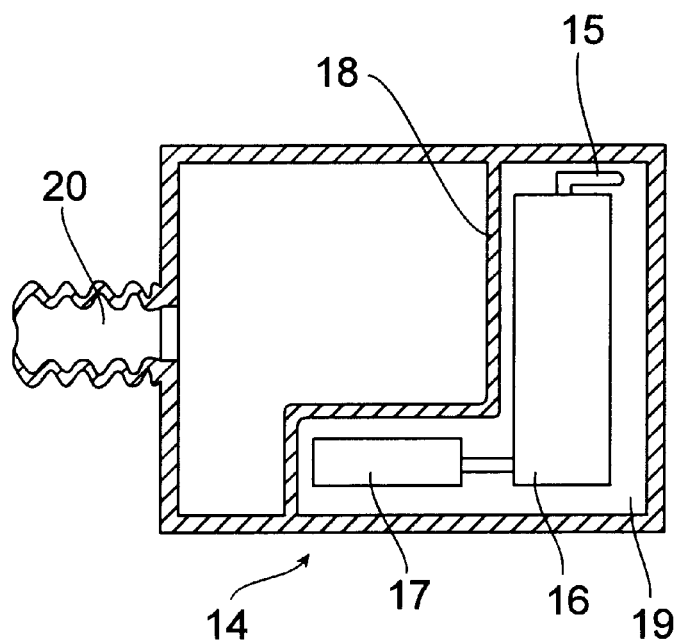
FIG. 7 is a sectional plan view to show the auxiliary fuel tank.

A separation wall 18 extending substantially vertically up stands on a lower wall 50 of the auxiliary fuel tank 14. This separation wall 18 is placed so as to surround the fuel pump 16 and filter 17, as illustrated in FIG. 7, to form an accommodation chamber 19 for accommodating the fuel pump 16 and filter 17, thereby preventing the fuel around the filter 17 from being drained away when the auxiliary fuel tank 14 is inclined so as to incline the fuel level in the auxiliary fuel tank 14. Accordingly, this separation wall 18 functions as fuel drain preventing means.

As illustrated in FIG. 1, an upper surface of an upper wall 52 of the auxiliary fuel tank 14 and an upper surface of part 3a below the lower wall 8 on the side between the fuel pipe 60 and the side wall 9a, in the lower portion 3 of the housing 4 (the part 3a will be referred to simply as predetermined part of the lower portion 3) match with the shape of the lower wall 8 when the lower wall 8 of the partition wall 6 is curved downward; and a lower surface of the upper portion 2 of the housing 4 matches with the shape of the upper wall 7 when the upper wall 7 of the partition wall 6 is curved upward.

When the lower wall 8 is curved downward to go into contact with the upper wall 52 of the auxiliary fuel tank 14 and with the upper surface of the predetermined part 3a of the lower portion 3 of the housing 4, the upper wall 52 and the predetermined part 3a of the lower portion 3 prevent the lower wall 8 from being further curved downward, thereby regulating the downward curvature of the lower wall 8 at predetermined magnitude; when the upper wall 7 is curved upward to go into contact with the lower surface of the upper portion 2 of the housing 4, the upper portion 2 prevents the upper wall 7 from being further curved upward, thereby regulating the upward curvature of the upper wall 7 at predetermined magnitude. The magnitudes of the curvature deformations thus regulated are those equivalent to the full tank amount of fuel, for example.

Therefore, the upper wall 52 of the auxiliary fuel tank 14, the predetermined part 3a of the lower portion 3 of the housing 4, and the upper portion 2 of the housing 4 work each as curvature deformation regulating means for regulating the curvature of the lower wall 8 or the upper wall 7 at the predetermined magnitude.

Accordingly, the lower wall 8 and upper wall 7 of the partition wall 6 are prevented from being curved excessively over the predetermined allowable level, by the upper wall 52 of the auxiliary fuel tank 14, the predetermined part 3a of the lower portion 3 of the housing 4, and the upper portion 2 of the housing 4. The upper wall 7 and lower wall 8 are thus protected during the curvature deformation. In addition, the upper wall 7 and lower wall 8 are further protected during the curvature deformation, because the shape of the upper wall 52 of the auxiliary fuel tank 14 and the predetermined part 3a of the lower portion 3 of the housing 4 matches with the shape of the downward curvature of the lower wall 8 while the shape of the upper portion 2 of the housing 4 matches with the shape of the upward curvature of the upper wall 7. The upper wall 7 and lower wall 8 are protected in this way, thereby preventing deterioration of or damage to the fuel tank 70 due to excess deformation.

Since the upper wall 52 of the auxiliary fuel tank 14 is utilized for prevention of deformation of the lower wall 8 as described above, there is no dead space below the partition wall 6, the whole of the fuel storage apparatus 1 is compactified, and the mountability of the fuel storage apparatus 1 is improved. In addition, the fuel in the fuel storage chamber 5 is supplied to the auxiliary fuel tank 14 with reliability, because the auxiliary fuel tank 14 is located below the fuel storage chamber 5.

The supply of the fuel through the fuel supply pipe 10 into the fuel storage chamber 5 is stopped when the lower wall 8 of the partition wall 6 comes to contact the upper wall 52 of the auxiliary fuel tank 14 and the top surface of the predetermined part 3a of the lower portion 3 of the housing 4 and when the upper wall 7 of the partition wall 6 comes to contact the lower surface of the upper portion 2 of the housing 4. Namely, the maximum storage amount of the fuel in the fuel storage chamber 5 is determined by the upper wall 52 of the auxiliary fuel tank 14, the predetermined part 3a of the lower portion 3 of the housing 4, and the upper portion 2 of the housing 4.

From this reason, the upper wall 52 of the auxiliary fuel tank 14, the predetermined part 3a of the lower portion 3 of the housing 4, and the upper portion 2 of the housing 4, working as the curvature deformation regulating means, also serve each as fuel storage amount defining means for defining the maximum amount of the fuel that can be stored in the fuel storage chamber.

Figure 8:
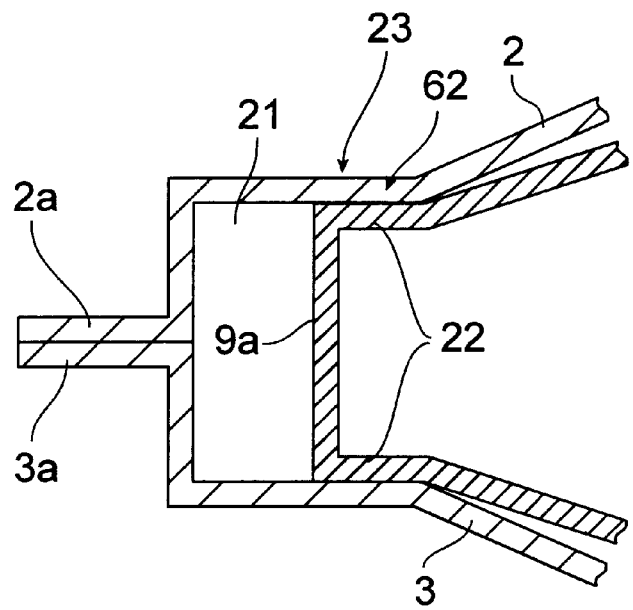
FIG. 8 is a detailed sectional view to show an enlarged view of part A in FIG. 1.

Inside the entire circumference of the housing peripheral part connecting the upper portion 2 and lower portion 3 of the housing 4, as illustrated in FIG. 1 and FIG. 8, a space 21 having approximately the same height as that of the side walls 9a to 9d of the partition wall 6 is formed by the upper portion 2 and the lower portion 3. Accommodated in this space 21 are the side walls 9a to 9d and connecting portions 22 of the upper and lower walls 7, 8 connected to the side walls 9a to 9d. Regarding the connecting portions 22 of the upper and lower walls 7, 8 as parts of the side walls, the connecting portions 22 of the upper and lower walls 7, 8 and the side walls 9a to 9d together will be called a side-wall-equivalent portion 62, which corresponds to the peripheral part of the partition wall 6 (fuel tank 70).

In this way the partition wall 6 is supported so as to be horizontally slidable relative to the housing 4 while the side-wall-equivalent part 62 is pinched by the upper portion 2 and the lower portion 3 of the housing 4. Namely, the housing peripheral part connecting the upper portion 2 and lower portion 3 of the housing 4 constitutes a pinching portion 23 which horizontally slidably pinches the side-wall-equivalent part 62 of the partition wall 6 (see FIG. 8). This pinching portion 23 functions as a support member for supporting the partition wall 6.

The above side-wall-equivalent part 62 is displaced as horizontally sliding in the pinching portion 23 during the curvature deformation of the upper wall 7 and lower wall 8. During the curvature deformation of the upper wall 7 and lower wall 8, upward and downward displacement of the connecting portions 22 of the upper wall 7 and lower wall 8 is very small relative to the upper wall 7 and lower wall 8. Therefore, as illustrated in FIG. 8, the pinching portion 23 does not restrain the upward and downward curvature deformation of the upper wall 7 and lower wall 8.

Since the partition wall 6 is supported at the side-wall-equivalent part 62 by the pinching portion 23 of the housing 4 in this way, the upper wall 7 and lower wall 8 are permitted to undergo the upward and downward curvature deformation according to the fuel amount in the fuel storage chamber 5.

In the fuel tank 70 constructed as described above, the fuel is supplied through the fuel supply pipe 10 into the partition wall 6 the basic shape of which is the substantially rectangular parallelepiped shape illustrated in FIG. 2, and with increase of the fuel amount in the fuel storage chamber 5 over the aforementioned predetermined amount, the upper wall 7 becomes curved upward and the lower wall 8 becomes curved downward, while the side walls 9a to 9d become curved inward. These curvatures gradually increase according to the increase in the fuel amount without being restrained by the pinching portion (support member) 23 supporting the fuel tank 70, so as to increase the capacity of the fuel storage chamber 5, whereby the fuel can be stored up to the maximum in the fuel storage chamber 5. At this time the fuel is also charged into the auxiliary fuel tank 14.

As described above, the present embodiment is adapted so that the greater amount of the fuel can be stored in the fuel storage chamber 5 than in the fuel tank inhibiting the upward curvature of the upper wall 7 and the downward curvature of the lower wall 8 with increase in the fuel amount. Because of this structure, the amount of the fuel that can be stored in the fuel storage chamber 5 can be maintained at the maximum.

On the other hand, in the fuel discharge operation the fuel pump is actuated to feed the fuel from the fuel storage chamber 5 through the fuel pipe 60, fuel inlet pipe 20, filter 17, and fuel feed pipe 15 to the fuel injection valves of the internal combustion engine. The upward curvature of the upper wall 7, the downward curvature of the lower wall 8, and the inward curvature of the side walls 9a to 9d become gradually relaxed with decrease of the fuel amount in the fuel storage chamber 5 and then the partition wall 6 returns to the substantially rectangular parallelepiped shape illustrated in FIG. 2 when the fuel amount of the fuel storage chamber 5 is decreased to the predetermined amount.

As the fuel is further fed from the fuel storage chamber 5 so as to decrease the fuel amount in the fuel storage chamber 5 to below the predetermined amount, the negative pressure due to suction makes the upper wall 7 curved downward, the lower wall 8 curved upward, and the side walls 9a to 9d curved inward as illustrated in FIG. 5. These curvatures gradually increase according to the decrease of the fuel amount without being restrained by the pinching portion 23 supporting the fuel tank 70. When the upper wall 7 becomes abutting against the lower wall 8 approximately at their center to be in close contact therewith, as illustrated in FIG. 6, further curvature deformation is stopped.

As described above, the present embodiment is adapted so that the capacity of the space in the fuel storage chamber 5 is decreased more than in the fuel tank inhibiting the lower curvature of the upper wall 7 and the upper curvature of the lower wall 8 with decrease in the fuel amount, by the degree corresponding to the capacity of the fuel storage chamber 5 decreased by the curvatures. Because of this structure, the evaporated fuel is decreased drastically.

Incidentally, when the fuel storage apparatus 1 is mounted on a vehicle, the vibration of the vehicle may vibrate the fuel tank 70 up and down (i.e., vertical G may vibrate it). Increase of the vertical vibration of this fuel tank 70 will produce noise or damage the side-wall-equivalent portion 62 of the fuel tank 70 supported by the pinching portion 23 of the housing 4. The second embodiment is thus arranged to suppress the vertical vibration of the fuel tank 70 without restraining the curvature deformation of the fuel tank 70.

Figure 9:
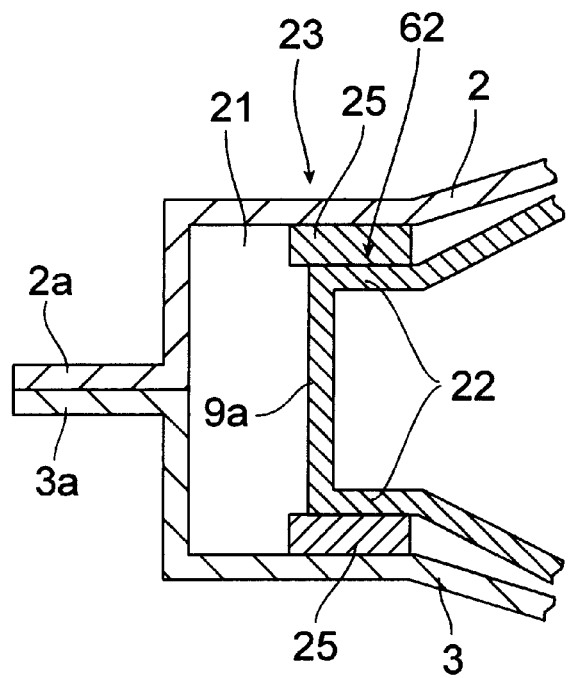
FIG. 9 is a detailed sectional view, similar to FIG. 8, to show a fuel storage apparatus provided with the fuel tank of the second embodiment.
Figure 10:
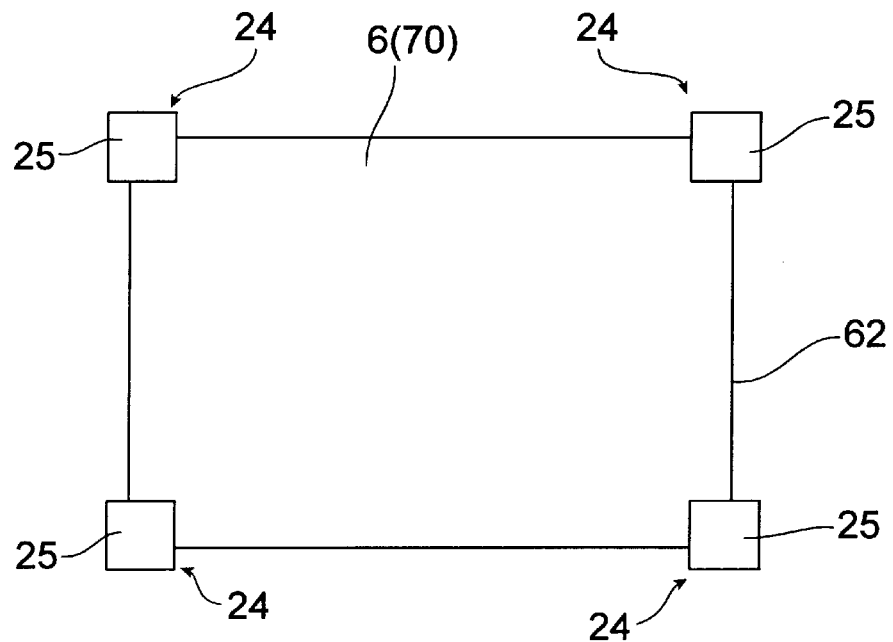
FIG. 10 is a schematic plan view to show the fuel tank of the second embodiment.

Referring to FIG. 9 and FIG. 10, the second embodiment is adapted so that vibration-isolating members (elastic members) 25 of rubber having elasticity, for example, are interposed each between the four corners 24 of the partition wall 6 (fuel tank 70) and the pinching portion 23 of the housing 4.

Here, the vibration-isolating members 25 are made of rubber and the partition wall 6 is made of resin as described previously; therefore, the side-wall-equivalent portion 62 is hard to slide relative to the vibration-isolating members 25.

In this second embodiment the vibration-isolating members 25 are, therefore, provided at the four corners 24 (parts of the side-wall-equivalent portion 62) which have the connecting portions 9e to 9h connecting the upper wall 7, the lower wall 8, and adjacent side walls and which have the highest rigidity, as compared with the other portions, and thus undergo little deformation.

Therefore, the deformation of the side walls 9a to 9d, the upper wall 7, and the lower wall 8 will not be suppressed even if the corners 24 are supported through the vibration-isolating members 25 by the pinching portion 23; and then, the side walls 9a to 9d, the upper wall 7, and the lower wall 8 can undergo the curvature deformation similar to that in the first embodiment.

Since the corners 24 have the high rigidity as described above, the partition wall 6 can be supported well even in the structure supporting only the corners 24.

Because of this structure supporting only the corners 24, the structure becomes simpler than the first embodiment supporting the whole of the side-wall-equivalent portion 62.

In this second embodiment constructed as described above, when the fuel tank 70 vibrates vertically, this vibration is transmitted to the vibration-isolating members 25 and the elastic action of the vibration-isolating members 25 suppresses the vertical vibration. Accordingly, the vibration-isolating members 25 correspond to vertical vibration suppressing means out of vibration suppressing means for suppressing (or attenuating) input of vibration from the outside of the fuel storage chamber 5 thereinto. This suppresses the damage to the fuel tank 70 and the production of noise.

The vibration-isolating characteristics of the vibration-isolating members 25, which are frequencies of vibration that can be prevented by the vibration-isolating members 25, differ depending upon the elastic modulus of the vibration-isolating members 25. Therefore, the elastic modulus of the vibration-isolating members 25 is properly selected according to the frequencies of the vertical vibration of the fuel tank 70 to be suppressed. The other structure, operation, and effect of the second embodiment are the same as those of the first embodiment and are thus omitted to explain herein.

Incidentally, when the fuel tank 70 is mounted on the vehicle, it is vibrated laterally by acceleration G (in front and back directions of the vehicle or in horizontal directions of the vehicle), which may produce the noise or damage the corners 24 of the side-wall-equivalent portion 62 supported by the housing 4. The third embodiment is thus arranged to suppress the vertical vibration of the fuel tank 70 and also suppress the lateral vibration thereof.

Figure 11:
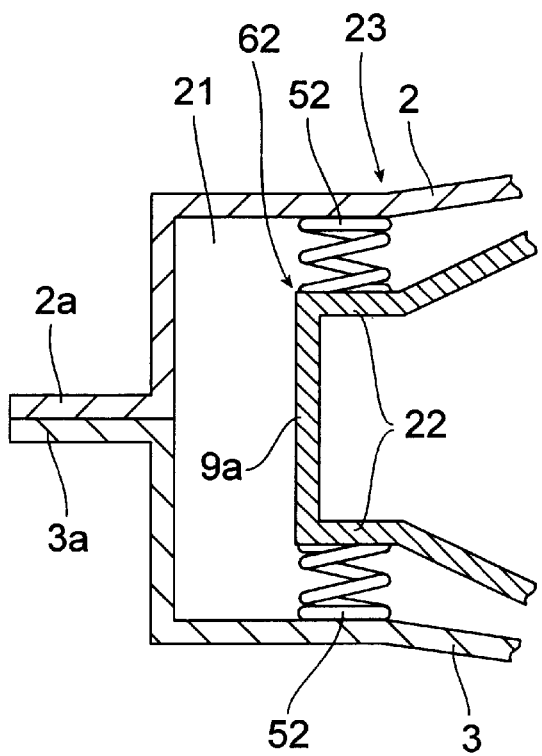
FIG. 11 is a detailed sectional view, similar to FIG. 8, to show a fuel storage apparatus provided with the fuel tank of the third embodiment.
Figure 12:
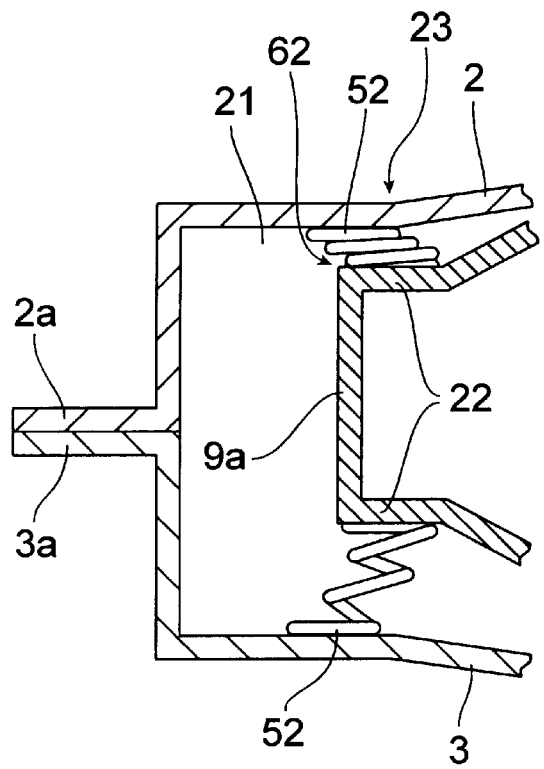
FIG. 12 is an explanatory drawing to show a state of vibration isolation of the fuel tank of FIG. 11.

In the third embodiment, as illustrated in FIG. 11, coil springs 52 as elastic members are located in place of the vibration-isolating members 25 of the second embodiment. The coil springs 52 extend and contract so as to permit the vertical and lateral vibration of the fuel tank 70, as illustrated in FIG. 12.

The coil springs 52 thus suppress the vertical vibration of the fuel tank 70 and also suppress the lateral vibration of the fuel tank 70 by their elastic action. Accordingly, the coil springs 52 function as vibration (vertical and lateral vibration) suppressing means. The other structure, operation, and effect of the third embodiment are the same as those of the second embodiment and thus the description thereof is omitted herein.

Meanwhile, in the second embodiment and third embodiment, the fuel tank 70 is supported only at the four corners 24 by the pinching portion 23 of the housing 4. Because of this structure, the support strength of the fuel tank 70 to the housing 4 is small and the housing 4 could fail to support the fuel tank 70 when the vibration of the fuel tank 70 is great. The fourth embodiment is thus arranged to suppress the vertical and lateral vibration of the fuel tank 70 and to enhance the support strength of the fuel tank 70 to the housing 4.

Figure 13:
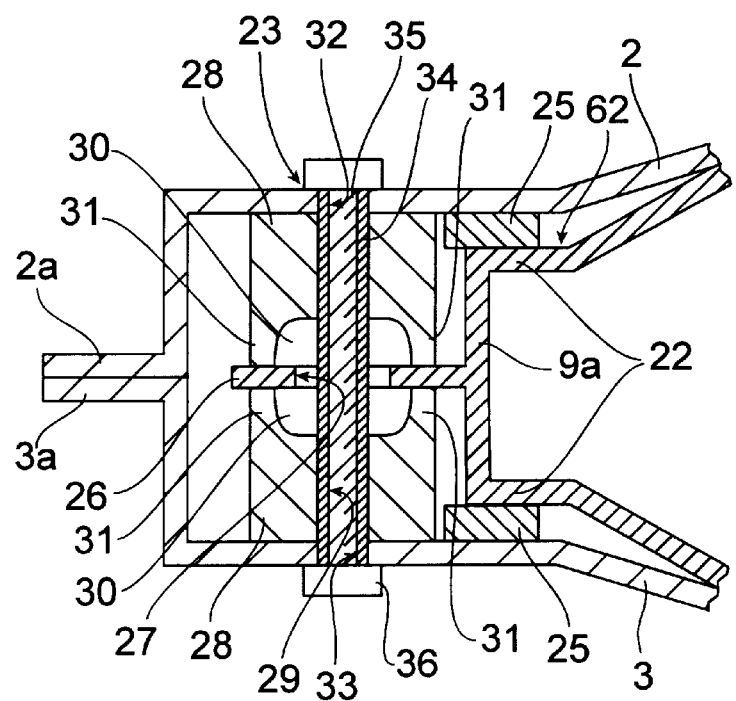
FIG. 13 is a detailed sectional view, similar to FIG. 8, to show a fuel storage apparatus provided with the fuel tank of the fourth embodiment.

In this fourth embodiment, as illustrated in FIG. 13, flanges (flange members) 26 extending laterally and outwardly horizontally from the side walls 9a to 9d are formed integrally with the side walls 9a to 9d. The flanges 26 are formed at the four corners 24 of the fuel tank 70. A flange through hole 27 vertically penetrating each flange 26 is formed in the central part of the flange 26 and a pair of second vibration-isolating members (elastic members) 28 of rubber having elasticity, for example, are located between the flange 26 and the upper portion 2 or the lower portion 3 (the pinching portion 23), i.e., on the both sides of the flange 26 in the vertical direction. Through the central portions of these second vibration-isolating members 28, 28, isolator through holes 29 vertically penetrating the second vibration-isolating members 28 are formed each coaxially with the flange through hole 27.

In a wall surface of each second vibration-isolating member 28 in contact with the flange 26, a groove or recess 30 is formed so as to surround the isolator through hole 29. Namely, each of the second vibration-isolating members 28 is provided with two legs 31 in contact with the flange 26. Further, an upper portion through hole 32 and a lower portion through hole 33 perpendicularly penetrating the upper portion 2 and lower portion 3 are formed coaxially with the isolator through hole 29, in the upper portion 2 and lower portion 3 (pinching portion 23). A collar 34 is inserted through these upper portion through hole 32, isolator through hole 29, flange through hole 27, and lower portion through hole 33. A bolt 35 is inserted into this collar 34 and this bolt 35 is fastened by a nut 36. The inside diameter of the flange through hole 27 is larger than the outside diameter of the collar 34.

In the fourth embodiment constructed as described above, the flange 26 is firmly fastened so as to be slidable relative to the upper portion 2 and lower portion 3 (pinching portion 23), through the second vibration-isolating members 28 by the collar 34, bolt 35, and nut 36. Therefore, the support strength of the fuel tank 70 to the housing 4 is higher than those in the second and third embodiments.

Since the inside diameter of the flange through hole 27 is larger than the outside diameter of the collar 34, the side walls 9a to 9d can be displaced laterally. Accordingly, the flanges 26 serve as slide support portions (the peripheral part of the partition wall 6) slidably supported relative to the housing 4.

Figure 14:
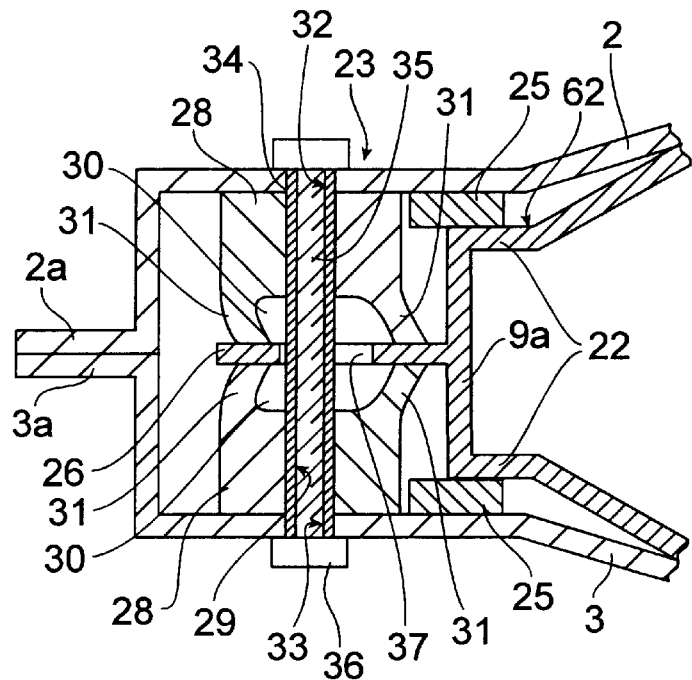
FIG. 14 is an explanatory drawing to show a state of vibration isolation of the fuel tank of FIG. 13.

With the lateral displacement of the side walls 9a to 9d, the two legs 31 of each second vibration-isolating member 28 are laterally displaced following the flange 26 because of their elastic action, as illustrated in FIG. 14. Thanks to this structure, the second vibration-isolating members 28 do not inhibit the lateral displacement of the side walls 9a to 9d and the second vibration-isolating members 28 suppress the lateral vibration of the fuel tank 70. Accordingly, the second vibration-isolating members 28 correspond to lateral vibration suppressing means. Of course, the second vibration-isolating members 28 also suppress the vertical vibration.

Therefore, the second vibration-isolating members 28 also correspond to vertical vibration suppressing means. The other structure, operation, and effect of the fourth embodiment are the same as those of the second embodiment and the description thereof is omitted herein.

Incidentally, the fourth embodiment is arranged to suppress the lateral vibration of the fuel tank 70, but the legs 31 of the second vibration-isolating members 28 are displaced largely according to the horizontal vibration of the fuel tank 70. Therefore, the second vibration-isolating members 28 except for the legs 31 do not contribute to the suppression of the lateral vibration. This means that the lateral vibration suppressing effect of the fuel tank 70 is rather weak in the fourth embodiment. The fifth embodiment is thus arranged to enhance the lateral vibration suppressing effect of the fuel tank 70.

Figure 15:
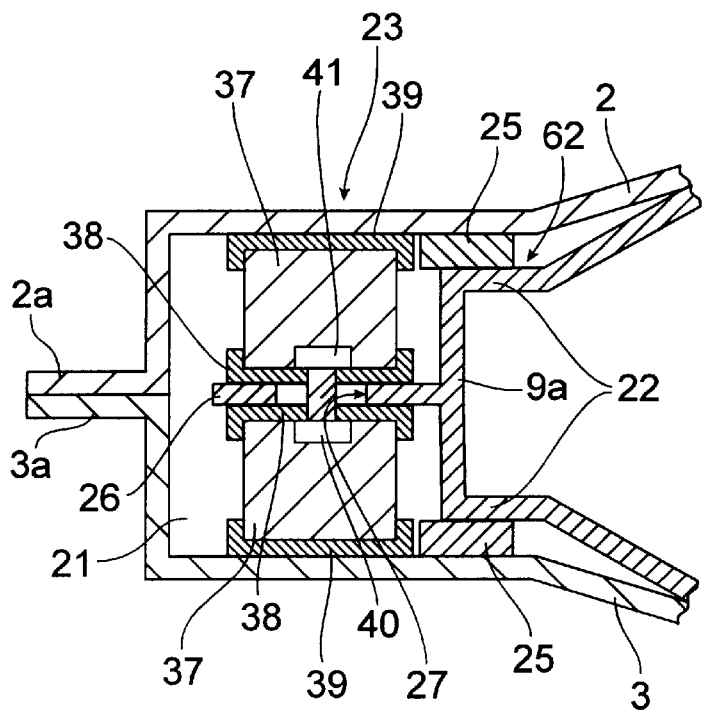
FIG. 15 is a detailed sectional view, similar to FIG. 8, to show a fuel storage apparatus provided with the fuel tank of the fifth embodiment.

In the fifth embodiment, as illustrated in FIG. 15, third vibration-isolating members 37, for example, of rubber having elasticity are placed on the both sides of the flanges 26 in the vertical direction. These third vibration-isolating members 37 are each in contact with the flange 26 through a collar 38, for example, of metal and are fixed each to the upper portion 2 or to the lower portion 3 (pinching portion 23) through a collar 39, for example, of metal. A bolt 40 is buried in the upper part of the lower third vibration-isolating member 37 while a nut 41 is buried in the lower part of the upper third vibration-isolating member 37. Then the bolt 40 is inserted through the above flange through hole 27 to be fastened by the nut 41.

Figure 16:
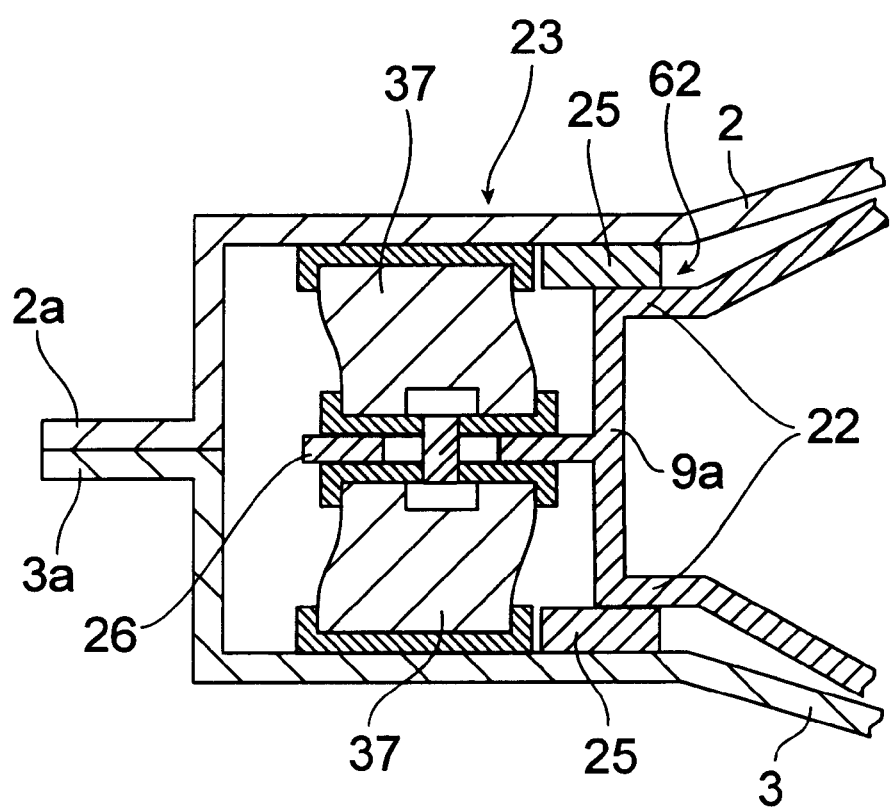
FIG. 16 is an explanatory drawing to show a state of vibration isolation of the fuel tank of FIG. 15.

In the fifth embodiment, as illustrated in FIG. 16, when the side walls 9a to 9d of the fuel tank 70 are displaced laterally, the third vibration-isolating members 37 follow this displacement to be deformed because of their elastic action. At this time, the third vibration-isolating members 37 are totally deformed, so as to suppress the lateral vibration of the fuel tank 70. Accordingly, the third vibration-isolating members 37 function as lateral vibration suppressing means. Since the third vibration-isolating members 37 are totally deformed as described above, the lateral vibration of the fuel tank 70 is more suppressed than in the fourth embodiment. The other structure, operation, and effect of the fifth embodiment are the same as those of the second embodiment and the description thereof is omitted herein.

Incidentally, there are cases where the fuel pump 16 has to be installed vertically because of the shape of the space for placement of the fuel storage apparatus 1 and piping. The sixth embodiment is thus adapted for the vertical placement of the fuel pump 16.

Figure 17:
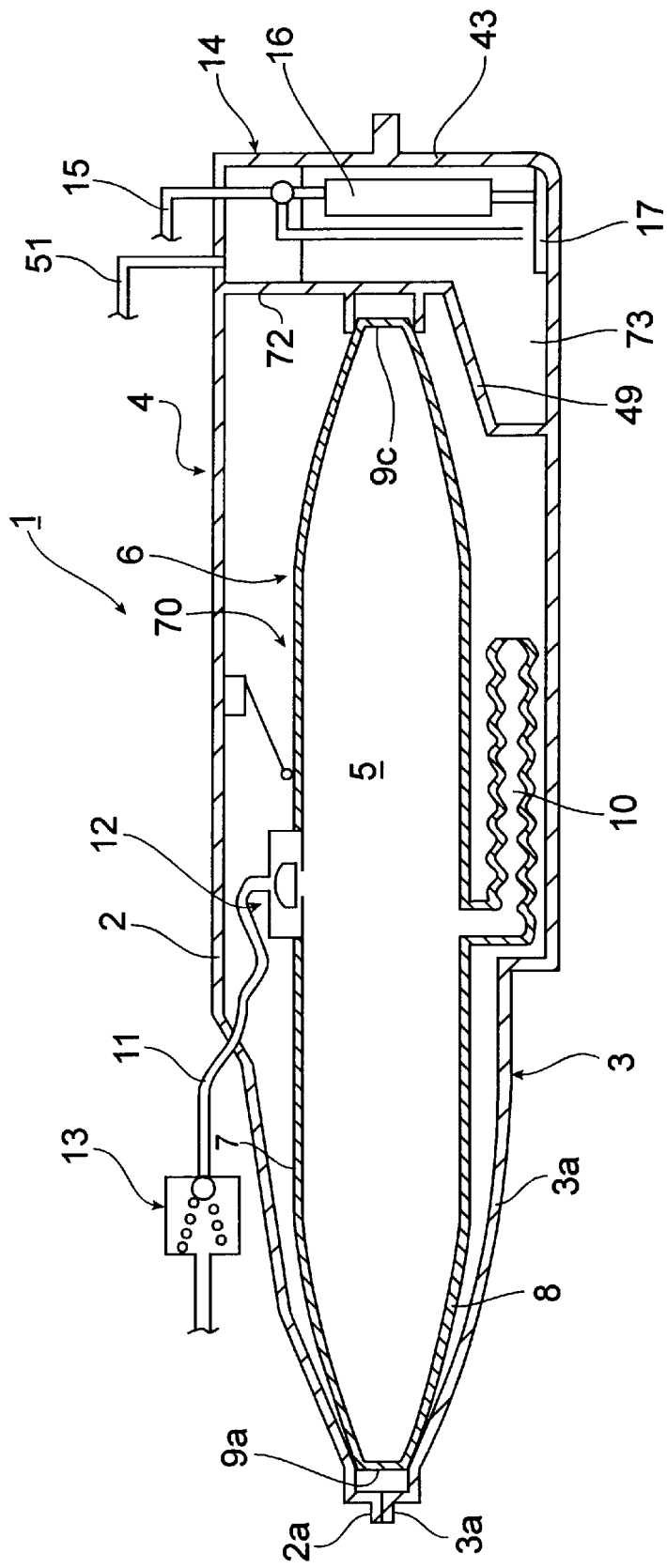
FIG. 17 is a partial sectional view to show a fuel storage apparatus provided with the fuel tank of the sixth embodiment.

As illustrated in FIG. 17, the auxiliary fuel tank 14 forming the fuel storage apparatus 1 is placed in a side portion of the housing 4, and the filter 17 and the fuel pump 16 vertically installed are provided in this auxiliary fuel tank 14. The auxiliary fuel tank 14 is provided with a housing side wall portion 43 extending vertically and connecting the upper portion 2 to the lower portion 3 of the housing 4 at the side portion, a housing shutting wall portion 72 standing inside the housing side wall portion 43 and shutting the auxiliary fuel tank from the fuel tank 70, and a space portion 73 defined by these housing side wall portion 43, housing shutting wall portion 72, upper portion 2, and lower portion 3 and including the above fuel pump 16 and filter 17. The housing shutting wall portion 72 has a deformation regulating wall 49 as curvature deformation regulating means in the lower side thereof near the fuel tank 70, and this deformation regulating wall 49 regulates the downward curvature of the lower wall 8 forming the partition wall 6 at the predetermined magnitude. The evaporated fuel in the auxiliary fuel tank 14 is fed through an evaporated fuel feed pipe 51 to the charcoal canister.

The other structure, operation, and effect of the sixth embodiment are the same as those of the first embodiment and the description thereof is omitted herein.

Incidentally, in the first to the sixth embodiments, the fuel tank 70 experiences more downward bending of the lower wall 8 than bending of the upper wall 7 because of the weight of the fuel tank 70 including the fuel. Because of this, the magnitude of the upward curvature of the upper wall 7 is not coincident with the magnitude of the downward curvature of the lower wall 8 during the curvature deformation of the partition wall 6 according to the increase of the fuel amount in the fuel storage chamber 5. Namely, the curvature deformation amounts of the upper wall 7 and the lower wall 8 are different from each other (the shapes of the upper wall 7 and lower wall 8 become asymmetric), which could twist and break the side walls 9a to 9d connecting them. In addition, the capacity of the fuel storage chamber 5 is instable. Further, the fuel measurement becomes inaccurate in the case of the pendulum type fuel gage 71 (see FIG. 1) for measuring the fuel amount from the displacement position of the upper wall 7 as described previously. The seventh embodiment is thus arranged to prevent occurrence of twisting of the side walls 9a to 9d during the curvature deformation of the partition wall 6, to stabilize the capacity of the fuel storage chamber 5, and to make the fuel measurement accurate.

Figure 18:
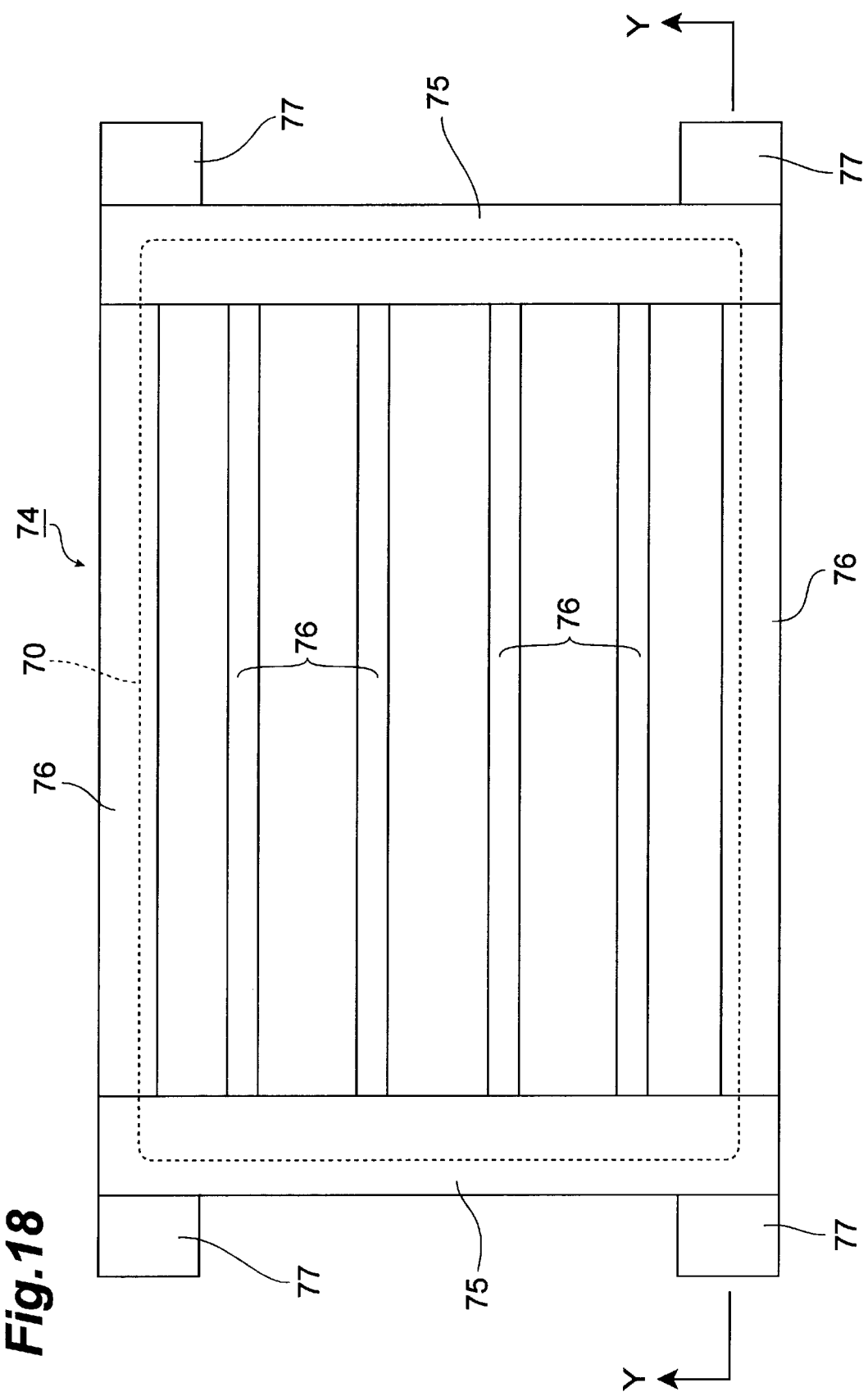
FIG. 18 is a plan view to show the major part of a fuel storage apparatus provided with the fuel tank of the seventh embodiment.
Figure 19:
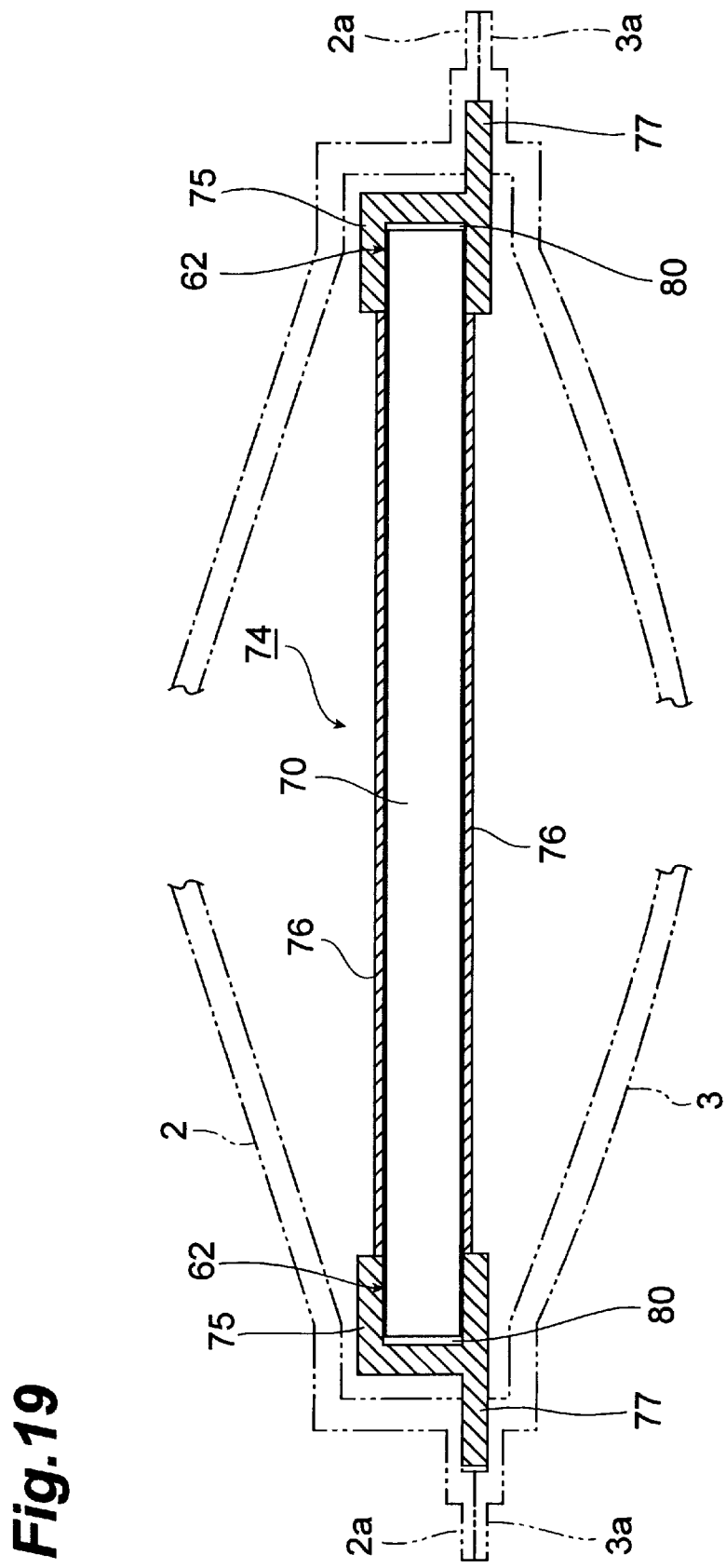
FIG. 19 is a sectional view taken along line Y—Y of FIG. 18.

In this seventh embodiment, as illustrated in FIG. 18 and FIG. 19, the fuel tank 70 is supported as being accommodated in a fuel tank accommodating section 74. This fuel tank accommodating section 74 is generally composed of a pair of holding portions 75 the vertical cross section of which is the U-shape and which are placed so that recesses (gaps) 80 forming the U-shape are opposed to each other, and a plurality of resin members 76 connecting these holding portions 75.

The resin members 76 are made, for example, of such resin as polyacetal and in a thin plate shape (sheet shape), and a plurality of such resin members 76 are provided for each of the upper side and lower side of the holding portions 75, thereby connecting the holding portions 75 to each other on the upper side and on the lower side. Then the fuel tank 70 is placed in a space portion defined by the two holding portions 75 and the upper and lower resin members 76.

The height of the recess portions 80 of the holding members 75 is approximately equal to that of the side walls 9a to 9d of the partition wall 6 and the side-wall-equivalent portion 62 of the partition wall 6 (fuel tank 70) described previously is accommodated in these recess portions 80. This side-wall-equivalent portion 62 is supported so as to be horizontally slidable relative to the holding portions 75 while being pinched by the holding portions 75. Accordingly, the holding portions 75 work as support members (pinching portions) for horizontally slidably pinching the side-wall-equivalent portion (peripheral part) 62 of the fuel tank 70.

Fixing portions 77 of a flat plate shape are connected respectively to the both ends of each holding member 75 on the lower side. The four fixing portions 77 of the two holding portions 75 are fixed each to the peripheral part of the housing 4. With these changes, the shape of the peripheral part of the upper portion 2 and the lower portion 3 of the housing 4 is also modified so as to be able to accommodate the fuel tank accommodating portion 74.

In the seventh embodiment constructed as described above, the lower resin members 76 receive the weight of the fuel tank 70 including the fuel and are elastically deformed while dispersing the load exerted by the lower wall 8 according to the downward curvature of the lower wall 8, so as to support the lower wall 8 with permitting the curvature of the lower wall 8. During this curvature deformation, the upper and lower resin members 76 are extended well in the curvature deformation direction while horizontally expanding clearances between other adjacent resin members 76 with following the curvature deformation of the upper wall 7 and lower wall 8. Accordingly, the lower resin members 76 function as elastically deformable support members (support members) for supporting the lower wall 8 while receiving the weight of the fuel tank 70 including the fuel and permitting the downward curvature deformation of the lower wall 8 with eliminating the influence of the weight.

Since the lower resin members 76 permit the downward curvature of the lower wall with receiving the weight of the fuel tank 70 including the fuel, the downward curvature deformation amount of the lower wall 8 becomes approximately coincident with the upward curvature deformation amount of the upper wall 7. Accordingly, the lower resin members 76 also serve as deformation amount adjusting means for adjusting the downward curvature deformation amount of the lower wall 8 so as to match with the upward curvature deformation amount of the upper wall 7 (or for making the downward curvature deformation amount of the lower wall 8 approximately coincident with the upward curvature deformation amount of the upper wall 7).

The reason why the resin members 76 are also provided on the upper side is that the upward curvature deformation amount of the upper wall 7 is further equalized to the downward curvature deformation amount of the lower wall 8 by controlling the magnitude of the upward curvature deformation of the upper wall 7. Accordingly, the upper resin members 76 also serve as the above deformation amount adjusting means.

Since the resin members 76 keep the magnitudes of the curvature deformations of the upper wall 7 and the lower wall 8 approximately coincident with each other with increase of the fuel amount, the occurrence of twisting of the side walls 9a to 9d is prevented, the capacity of the fuel storage chamber 5 is stabilized, and the fuel measurement is made accurate. Since the resin members 76 support the fuel tank 70 with being elastically deformed, the vibration of the fuel tank 70 is suppressed, the damage to the fuel tank 70 is also prevented, and the production of noise is also restrained. Accordingly, the resin members 76 also work as the vibration suppressing means described above.

Figure 20:
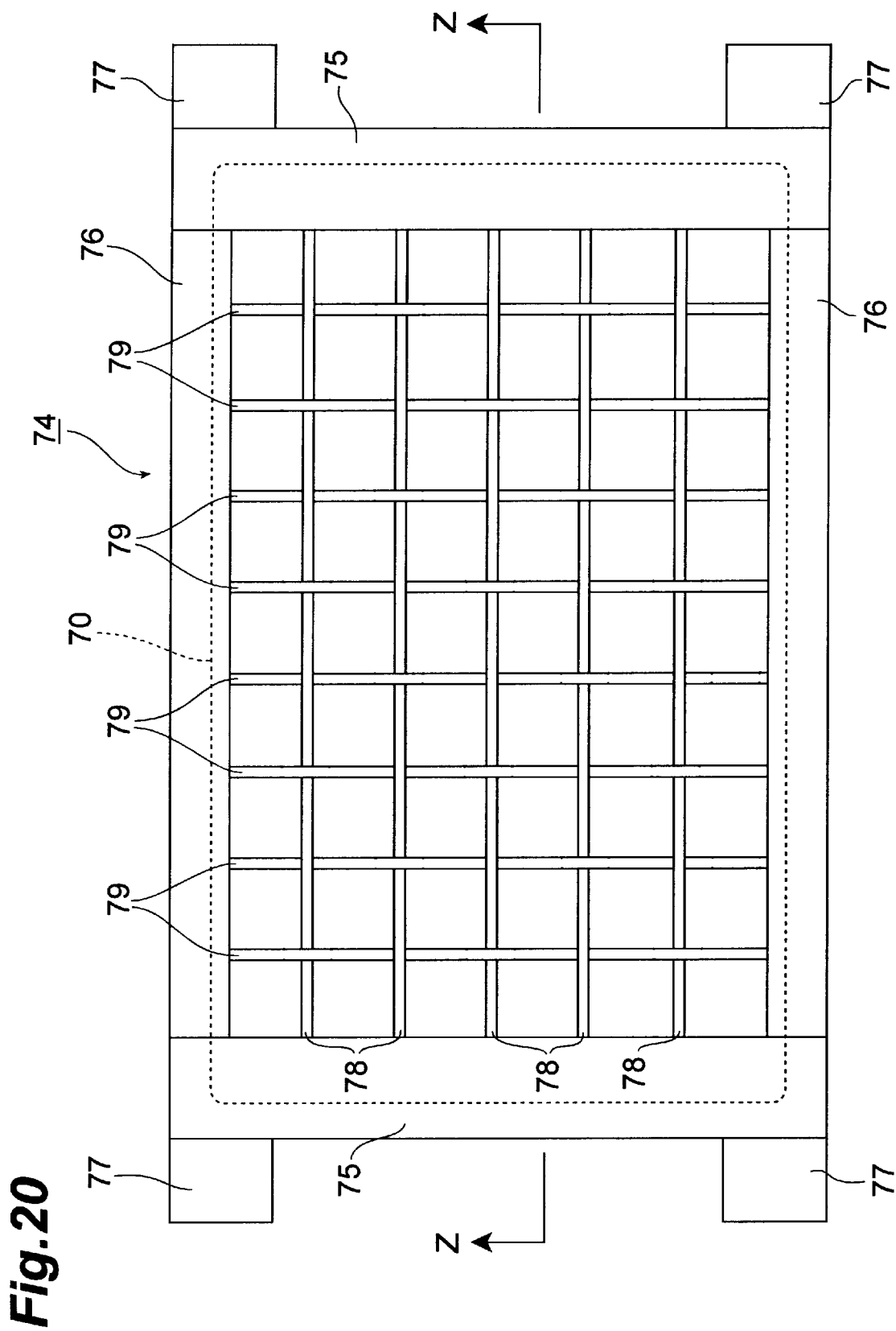
FIG. 20 is a plan view to show the major part of a fuel storage apparatus provided with the fuel tank of the eighth embodiment.
Figure 21:
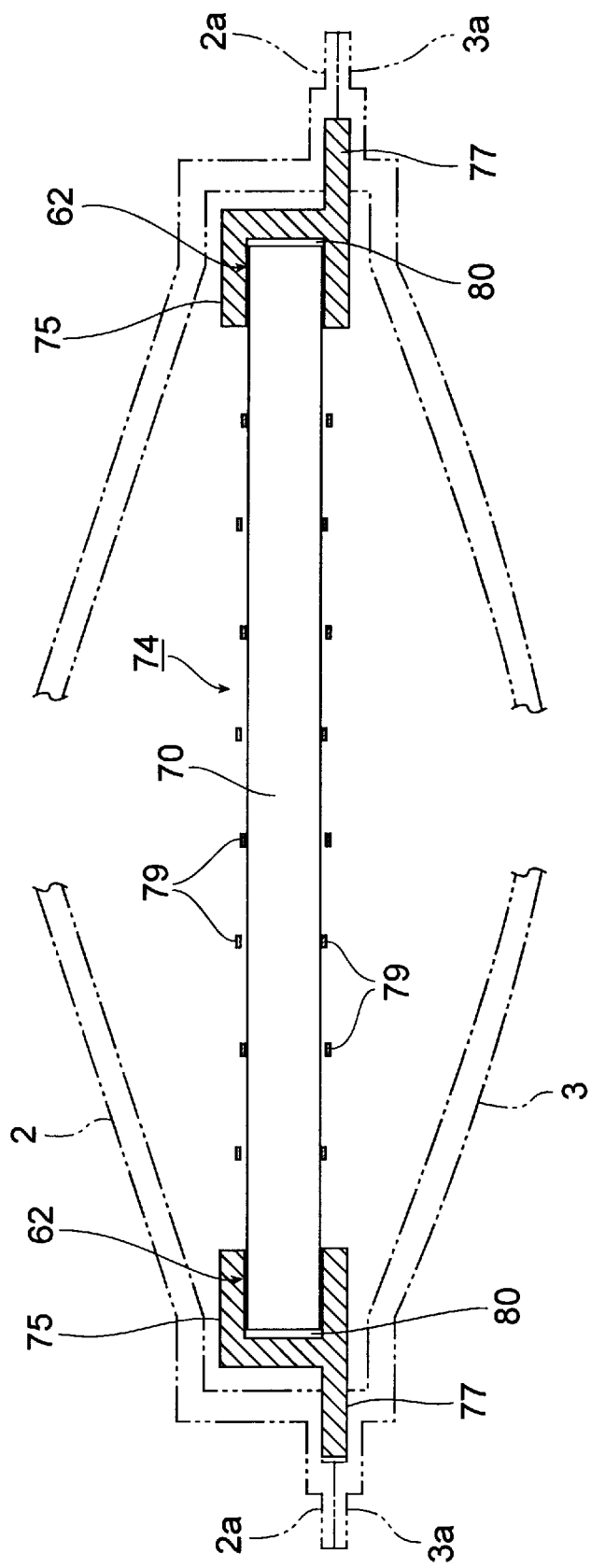
FIG. 21 is a sectional view taken along line Z—Z of FIG. 20.

FIG. 20 is a plan view to show the major part of the fuel storage apparatus provided with the fuel tank of the eighth embodiment and FIG. 21 is a sectional view thereof taken along line Z—Z of FIG. 20.

The eighth embodiment is different from the seventh embodiment in that resin members 78, 79 forming meshes are used as elastically deformable support members, in place of the plurality of resin members 76 of the thin plate shape connecting the holding portions 75 to each other. Of course, the resin members 78, 79 as elastically deformable support members also serve as the aforementioned deformation amount adjusting means and as the vibration suppressing means. Each of the resin members 78, 79 forming the meshes is a wirelike resin member and they are placed so as to cross each other up and down like seams. In another configuration the holding portions 75 may be connected to each other only by the wirelike resin members 78.

It is needless to mention that this structure can also achieve the same operation and effect as the seventh embodiment.

Although the seventh and eighth embodiments are arranged so that the resin members 76, 78, 79 are provided corresponding to the both upper wall 7 and lower wall 8 of the fuel tank 70 in order to equalize the deformation amounts of the upper wall 7 and lower wall 8 with each other, the resin members may be provided corresponding only to the lower wall 8 so as to make the deformation amounts of the upper wall 7 and lower wall 8 approximately coincident with each other. Namely, the upper resin members can be eliminated. The number of upper resin members (the number of lines) can also be made smaller than the number of lower resin members in order to further equalize the curvature deformations of the upper wall 7 and the lower wall 8 with each other.

Figure 22:
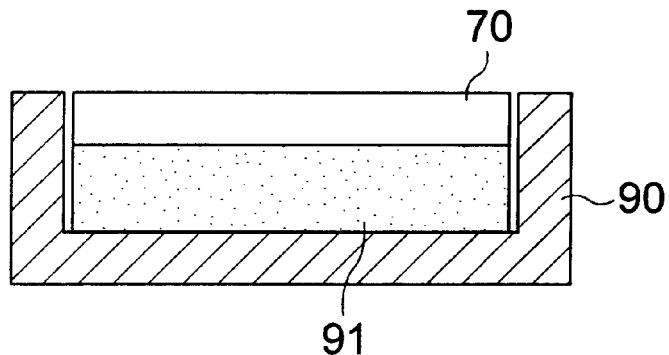
FIG. 22 is a sectional structural diagram to show the major part of a fuel storage apparatus provided with the fuel tank of the ninth embodiment.
Figure 23:
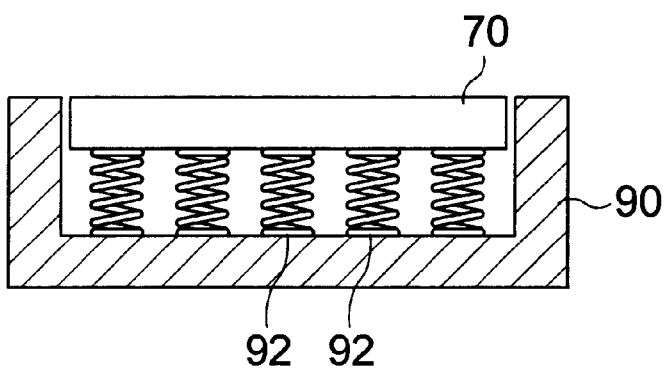
FIG. 23 is a sectional structural diagram to show the major part of a fuel storage apparatus provided with the fuel tank of the tenth embodiment.
Figure 24:
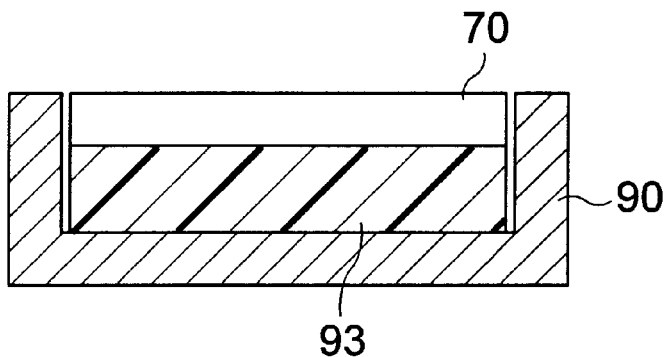
FIG. 24 is a sectional structural diagram to show the major part of a fuel storage apparatus provided with the fuel tank of the eleventh embodiment.

The elastically deformable support members 76, 78, 79 are not limited to the resin members. Like the ninth embodiment to the eleventh embodiment illustrated in FIG. 22 to FIG. 24, the apparatus can also be arranged so that the fuel tank accommodating section 74 described in the seventh and eighth embodiments is made as a recessed case 90, the fuel tank 70 is accommodated in this case 90, and the fuel tank 70 is mounted, for example, on a foamed member 91 (sponge or the like) illustrated in FIG. 22, or on spring members 92 (spring coils, plate springs, coned disk springs, etc.) illustrated in FIG. 23, or on a rubber member 93 illustrated in FIG. 24, as an elastically deformable support member placed in the case 90. The point is that the elastically deformable support member can be any member that abuts against the lower wall 8 and that supports the lower wall 8 so as to permit the curvature of the lower wall 8 with being elastically deformed while dispersing the load exerted by the lower wall 8 according to the downward curvature of the lower wall 8.

The present invention was described above in detail, based on the embodiments thereof, but the present invention is not limited only to the above embodiments. For example, the second to fifth embodiments described above were arranged so that the elastic members 25, 28, 37, 52 were interposed at the corners 24 of the fuel tank 70, but the elastic members may be arranged to be interposed throughout the whole of the side-wall-equivalent portion 62.

In the above embodiments the fuel tank was the fuel tank 70 composed of the upper wall 7 and lower wall 8 of the polygon shape opposed to each other, and the side walls 9a to 9d connecting these upper wall 7 and lower wall 8, but, without having to be limited to the fuel tank of this structure, the present invention can be applied to any fuel tank that is provided with the fuel storage chamber deformable according to the amount of the fuel stored therein.

As described above, the fuel tank according to the present invention is so constructed that the lower wall forming the fuel storage chamber is curved downward according to the increase of the fuel amount and that at this time the support member supporting the fuel storage chamber does not restrain the downward curvature of the lower wall, whereby the capacity of the fuel storage chamber can be increased, as compared with those inhibiting the deformation of the lower wall. As a result, the amount of the fuel that can be stored in the fuel storage chamber can be maintained at the maximum.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fuel tank comprising a fuel storage chamber which is deformable according to the amount of fuel stored therein, wherein said fuel storage chamber comprises a lower wall which becomes curved downward according to increase of said amount of fuel;

wherein said fuel storage chamber is supported by a support member which permit downward curvature of said lower wall; and wherein said fuel storage chamber is comprised of an upper wall and said lower wall of a polygonal shape opposed to each other, and peripheral walls connecting said upper wall and said lower wall to each other.

2. The fuel tank according to claim 1, wherein the walls forming said fuel storage chamber are made in multilayered structure of resin.

3. The fuel tank according to claim 1, wherein said support member supports a peripheral part of said fuel storage chamber.

4. The fuel tank according to claim 3, wherein said peripheral part of the fuel storage chamber is comprised of said peripheral walls and, connecting portions of said upper wall and said lower wall connected to the peripheral walls.

5. The fuel tank according to claim 3, wherein said support member supports corners of said peripheral part.

6. The fuel tank according to claim 1, wherein said peripheral walls have a flange member and said support member supports said flange member.

7. The fuel tank according to claim 1, wherein said upper wall is curved upward according to the increase of said amount of the fuel and said support member comprises deformation amount adjusting means, abutting against said lower wall, for adjusting a downward curvature deformation amount of said lower wall so as to match with an upward curvature deformation amount of said upper wall.

8. A fuel tank comprising a fuel storage chamber which is deformable according to the amount of fuel stored therein, wherein said fuel storage chamber comprises a lower wall which becomes curved downward according to increase of said amount of fuel;

wherein said fuel storage chamber is supported by a support member which permits downward curvature of said lower wall;

wherein below said fuel storage chamber there is provided curvature deformation regulating means for regulating the downward curvature of said lower wall at a predetermined magnitude; and wherein said curvature deformation regulating means is an auxiliary fuel tank located below said fuel storage chamber and connected to said fuel storage chamber to temporarily store the fuel from said fuel storage chamber.

9. The fuel tank according to claim 8, wherein said auxiliary fuel tank has a shape coincident with a shape of the lower wall during the downward curvature of said lower wall.

* * * * *